US012747752B2

(12) United States Patent
Himmelmann

(10) Patent No.: US 12,747,752 B2
(45) Date of Patent: Sep. 29, 2026

(54) FOIL BEARING STRUCTURE WITH DAMPING

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 29 days.

(21) Appl. No.: 18/928,900

(22) Filed: Oct. 28, 2024

(65) Prior Publication Data

US 2026/0117817 A1 Apr. 30, 2026

(51) Int. Cl.
*F16C 17/02* (2006.01)

(52) U.S. Cl.
CPC ........ *F16C 17/024* (2013.01); *F16C 2360/23* (2013.01)

(58) Field of Classification Search
CPC .................. F16C 17/024; F16C 17/042; F16C 27/00–08; F16C 2360/23
See application file for complete search history.

(56) References Cited

U.S. PATENT DOCUMENTS

| | | | | |
|---|---|---|---|---|
| 6,953,283 | B2 | 10/2005 | Matsunaga | |
| 6,964,522 | B2 | 11/2005 | Kang et al. | |
| 9,033,657 | B2 | 5/2015 | Gibson | |
| 9,109,622 | B2 | 8/2015 | Meacham et al. | |
| 9,506,566 | B2 | 11/2016 | Saville et al. | |
| 10,415,634 | B2 | 9/2019 | Park et al. | |
| 2011/0103725 | A1* | 5/2011 | Omori | F16C 17/024 384/276 |
| 2014/0376844 | A1* | 12/2014 | Swanson | F16C 27/02 29/898.12 |
| 2015/0110621 | A1* | 4/2015 | Saville | F04D 29/10 415/230 |

FOREIGN PATENT DOCUMENTS

| | | | | |
|---|---|---|---|---|
| CN | 106594059 B | | 8/2018 | |
| CN | 108730330 A | * | 11/2018 | F16C 17/024 |
| CN | 108730331 A | * | 11/2018 | F16C 27/08 |
| KR | 101531926 B1 | | 6/2015 | |

OTHER PUBLICATIONS

Machine Translation of CN-108730330-A (Year: 2018).*
Machine Translation of CN-108730331-A (Year: 2018).*

* cited by examiner

*Primary Examiner* — Alan B Waits
(74) *Attorney, Agent, or Firm* — CANTOR COLBURN LLP

(57) ABSTRACT

A bearing and damping structure of a foil bearing is provided. The bearing and damping structure includes interleaved spring plates and damper plates. Each spring plate includes an annular array of fingers to support a foil body of the foil bearing against radially-directed compressive forces. Friction induced between each damper plate and neighboring spring plates causes the fingers of the neighboring spring plates to resist deformation due to the radially-directed compressive forces for damping.

19 Claims, 10 Drawing Sheets

FOIL BEARING STRUCTURE WITH DAMPING

BACKGROUND

The present disclosure relates to foil bearings and, more particularly, to a low-cost foil bearing structure with improved adjustable damping.

A foil bearing is a type of bearing in which a shaft is supported by a compliant, spring-loaded foil journal lining. Once the shaft is spinning fast enough, a working fluid, which is usually air, pushes the foil away from the shaft so that no contact occurs. The shaft and foil are separated by the air's high pressure, which is generated by the rotation that pulls gas into the bearing via viscosity effects. The high speed of the shaft with respect to the foil is required to initiate the air gap, and once this has been achieved, no wear occurs.

BRIEF DESCRIPTION

According to an aspect of the disclosure, a bearing and damping structure of a foil bearing is provided. The bearing and damping structure includes interleaved spring plates and damper plates. Each spring plate includes an annular array of fingers to support a foil body of the foil bearing against radially-directed compressive forces. Friction induced between each damper plate and neighboring spring plates causes the fingers of the neighboring spring plates to resist deformation due to the radially-directed compressive forces for damping.

In accordance with additional and/or alternative embodiments, the spring plates and the damper plates are cooperatively formed to define cooling air holes.

In accordance with additional and/or alternative embodiments, each spring plate includes an annular body from which each finger extends and each finger of each spring plate includes a base at the corresponding annular body, a distal tip and one or more bends radially interposed between the base and the distal tip.

In accordance with additional and/or alternative embodiments, each finger of each spring plate includes two or more directionally opposed bends radially interposed between the base and the distal tip.

In accordance with additional and/or alternative embodiments, each damper plate includes an annular damper body and an annular array of damper fingers that each extend from the annular damper body.

According to an aspect of the disclosure, a foil bearing is provided and includes a bearing sleeve, a foil body, a clamp and a bearing and damping structure radially interposed between the bearing sleeve and the foil body. The bearing and damping structure includes interleaved spring plates and damper plates. Each spring plate includes an annular array of fingers to support the foil body against radially-directed compressive forces. The clamp exerts, on the bearing and damping structure, an axially-directed clamping force that induces damper-spring plate friction causing one or more of the fingers to resist deformation due to the radially-directed compressive forces for damping.

In accordance with additional and/or alternative embodiments, at least one of an outboard anti-rotation feature prevents relative rotation between the bearing sleeve and the bearing and damping structure and an inboard anti-rotation feature prevents relative rotation between the bearing and damping structure and the foil body.

In accordance with additional and/or alternative embodiments, the bearing sleeve includes an interior flange against which the bearing and damping structure impinges.

In accordance with additional and/or alternative embodiments, the foil body includes at least a top foil.

In accordance with additional and/or alternative embodiments, the spring plates and the damper plates are cooperatively formed to define cooling air holes.

In accordance with additional and/or alternative embodiments, each spring plate includes an annular body from which each finger extends and each finger of each spring plate includes a base at the corresponding annular body, a distal tip to contact the foil body and one or more bends radially interposed between the base and the distal tip.

In accordance with additional and/or alternative embodiments, each finger of each spring plate includes two or more directionally opposed bends radially interposed between the base and the distal tip.

In accordance with additional and/or alternative embodiments, each damper plate includes an annular damper body and an annular array of damper fingers that each extend from the annular damper body.

In accordance with additional and/or alternative embodiments, the axially-directed clamping force is circumferentially uniform.

According to an aspect of the disclosure, a method of assembling a foil bearing capable of damping is provided. The method includes forming spring plates to each include an annular array of fingers to support a foil body against radially-directed compressive forces, forming damper plates, interleaving the damper plates with the spring plates to assemble a bearing and damping structure, radially interposing the bearing and damping structure between a bearing sleeve and the foil body and exerting, on the bearing and damping structure, an axially-directed clamping force that induces damper-spring plate friction causing one or more of the fingers to resist deformation due to the radially-directed compressive forces for damping.

In accordance with additional and/or alternative embodiments, at least one of the forming of the spring plates and the forming of the damper plates includes at least one of forming an outboard anti-rotation feature to prevent relative rotation between the bearing sleeve and the bearing and damping structure and forming an inboard anti-rotation feature to prevent relative rotation between the bearing and damping structure and the foil body.

In accordance with additional and/or alternative embodiments, the forming of the spring plates includes forming the spring plates to define spring plate cooling air holes and the forming of the damper plates includes forming the damper plates to define damper plate cooling air holes which are cooperative with the spring plate cooling air holes.

In accordance with additional and/or alternative embodiments, the forming of the spring plates includes bending each finger of each spring plate one or more times.

In accordance with additional and/or alternative embodiments, the exerting of the axially-directed clamping force is executed circumferentially uniformly.

In accordance with additional and/or alternative embodiments, the method further includes adjusting the axially-directed clamping force to adjust a degree of the damping.

Additional features and advantages are realized through the techniques of the present disclosure. Other embodiments and aspects of the disclosure are described in detail herein and are considered a part of the claimed technical concept.

For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
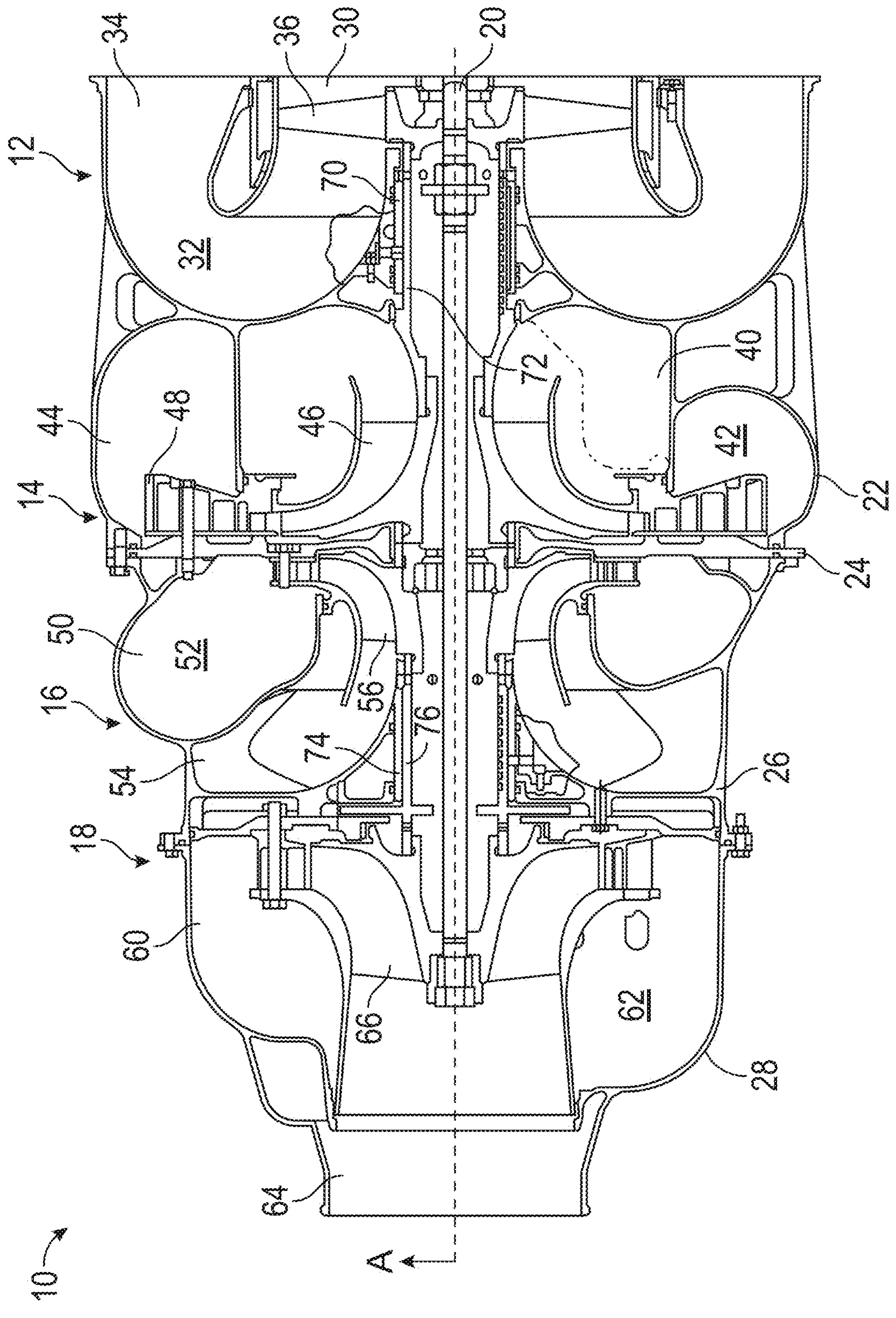
FIG. 1 is a cross-sectional view of an air cycle machine in accordance with embodiments.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin. A cabin air compressor can be used to compress air for use in an environmental control system. The cabin air compressor includes a motor to drive a compressor section that in turn compresses air flowing through the cabin air compressor.

Both air cycle machines and cabin air compressors have a shaft extending down a central axis that rotates. Bearings are positioned outward from the shaft to reduce friction between the rotating shaft and stationary components. Historically, ball bearings were used in air cycle machines and cabin air compressors. Ball bearings face limitations in that they wear out quickly and thus need to be replaced often. Further, ball bearings require oil for operation and the smell of the oil can seep into the air flowing through the air cycle machine and/or cabin air compressor before the air is delivered to the aircraft cabin.

To overcome the limitations of ball bearings, air bearings were later developed for use in air cycle machines and cabin air compressors. Air bearings create an air gap between a rotating part and the bearing components so that the air gap acts as the bearing. Examples of air bearings that can be used are bump foil bearings and metal mesh bearings. Bump foil bearings include a bump foil positioned between a top foil and a bearing sleeve. Metal mesh bearings include a metal mesh positioned between a top foil and a bearing sleeve. With both bump foil bearings and metal mesh bearings the top foil is positioned around the shaft. As air flows along the shaft, the top foil is pushed outward from the shaft to create an air gap between the rotating shaft and the top foil. Bump foil bearings have a high stiffness and can support high loads but have low damping characteristics. The low damping characteristics can lead to a phenomenon known as subsynchronous whirl, which is the problem of uncontrolled vibration of the shaft. Metal mesh bearings have high damping characteristics, but sag over time causing the shaft to become off centered.

Thus, as will be described below, a new type of foil bearing is provided with a backup structure that provides significant damping. The damping that is provided by the backup structure of this new type of bearing can be easily tuned to meet various needs and requirements of a given machine, such as a high-speed turbo-machine. To increase a load capacity of the foil bearing, it is possible to increase a foil pre-load near axial edges of the bearing to provide better sealing while decreasing pre-load near the middle of the bearing to reduce thermal heating. In addition, the foil bearing can incorporate a very soft spring rate that can be used to set a bearing pre-load and a relatively stiff spring rate that can be used to support the shaft during operation along with the use of a clamping plate that immobilizes the soft springs after the bearing is assembled and prior to machine operation.

FIG. 1 is a cross-sectional view of an air cycle machine 10, which includes fan section 12, compressor section 14, first turbine section 16, second turbine section 18, tie rod 20, fan and compressor housing 22, seal plate 24, first turbine housing 26, and second turbine housing 28. Also shown in FIG. 1 is axis A.

Fan section 12, compressor section 14, first turbine section 16, and second turbine section 18 are all mounted on tie rod 20. Tie rod 20 rotates about axis A. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14, first turbine housing 26 housing first turbine section 16, and second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan inlet 30 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor rotor 46, and diffuser 48. Air is routed into compressor inlet 40 and is ducted through compressor duct 42 to compressor outlet 44. Compressor rotor 46 and diffuser 48 are positioned in compressor duct 42. Compressor rotor 46 is mounted to and rotates with tie rod 20 to compress the air flowing through compressor duct 42. Diffuser 48 is a static structure through which the compressor air can flow after it has been compressed with compressor rotor 46. Air exiting diffuser 48 can then exit compressor duct 42 through compressor outlet 44.

First turbine section 16 includes first turbine inlet 50, first turbine duct 52, first turbine outlet 54, and first turbine rotor 56. Air is routed into first turbine inlet 50 and is ducted through first turbine duct 52 to first turbine outlet 54. First turbine rotor 56 is positioned in first turbine duct 52 and is mounted to and rotates with tie rod 20. First turbine rotor 56 will extract energy from the air passing through first turbine section 16 to drive rotation of tie rod 20.

Second turbine section 18 includes second turbine inlet 60, second turbine duct 62, second turbine outlet 64, and second turbine rotor 66. Air is routed into second turbine inlet 60 and is ducted through second turbine duct 62 to second turbine outlet 64. Second turbine rotor 66 is positioned in second turbine duct 62 and is mounted to and rotates with tie rod 20. Second turbine rotor 66 will extract energy from the air passing through second turbine section 18 to drive rotation of tie rod 20.

Air cycle machine 10 further includes first bearing 70, first rotating shaft 72, second bearing 74, and second rotating shaft 76. First bearing 70 is positioned in fan section 12 and is supported by fan and compressor housing 22. First rotating shaft 72 extends between and rotates with fan rotor 36 and compressor rotor 46. A radially outer surface of first rotating shaft 72 abuts a radially inner surface of first bearing 70. Second bearing 74 is positioned in first turbine section 16 and is supported by first turbine housing 26. Second rotating shaft 76 extends between and rotates with first turbine rotor 56 and second turbine rotor 66. A radially outer surface of second rotating shaft 76 abuts a radially inner surface of second bearing 74.

Figure 2:
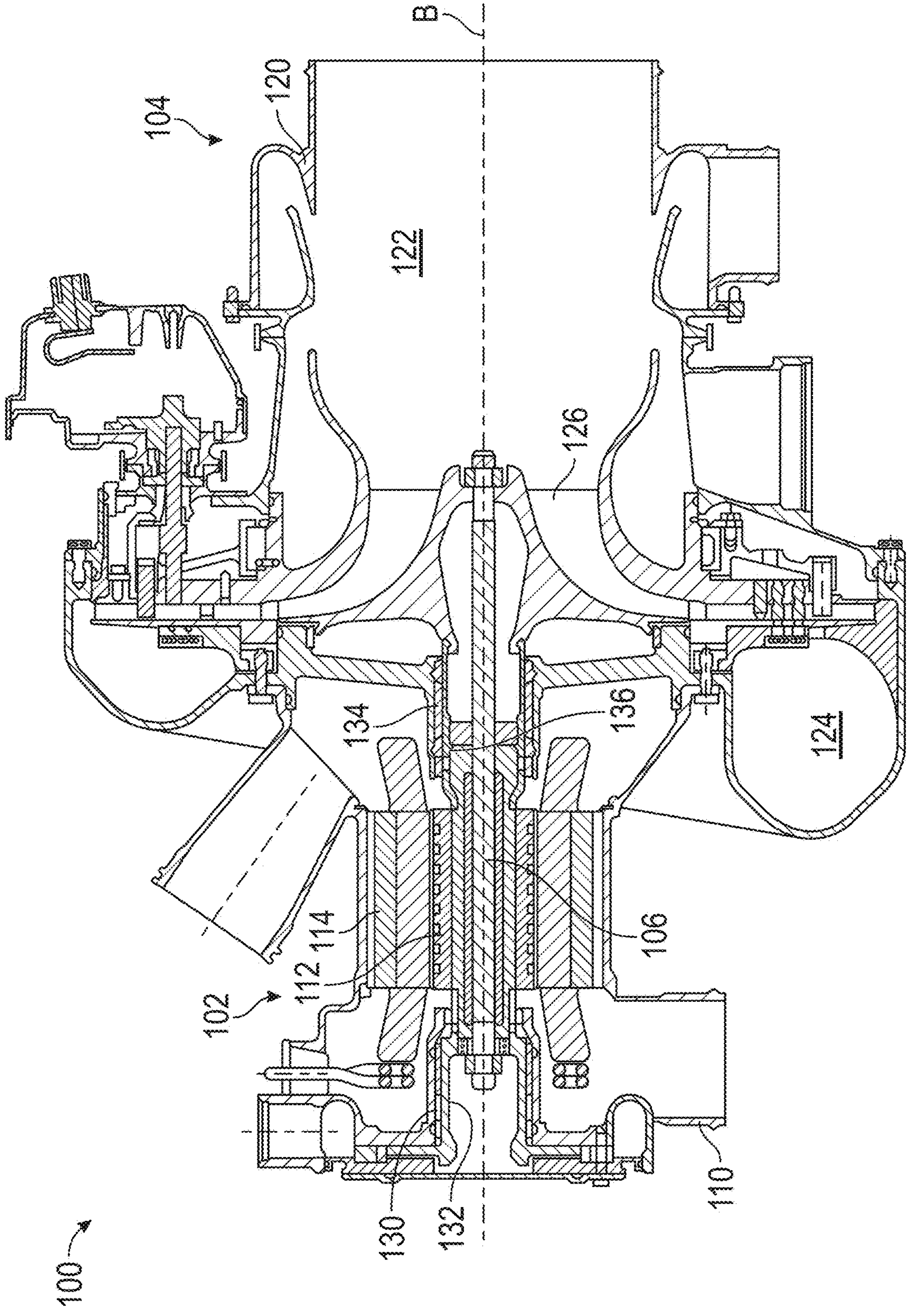
FIG. 2 is a cross-sectional view of an air compressor in accordance with embodiments.

FIG. 2 is cross-sectional view of an air compressor 100. Air compressor 100 includes motor 102, compressor section 104, and tie rod 106. Also shown in FIG. 2 is axis B. Motor 102 drives compressor section 104 in air compressor 100. Tie rod 106 extends through air compressor 100 and is centered on axis B. Motor 102 and compressor section 104 are mounted to tie rod 106. Motor 102 will drive tie rod 106 and cause it to rotate, which in turn will rotate compressor section 104.

Motor 102 includes motor housing 110, motor rotor 112, and motor stator 114. Motor housing 110 surrounds motor rotor 112 and motor stator 114. Motor 102 is an electric motor with motor rotor 112 disposed within motor stator 114. Motor rotor 112 is rotatable about axis B. Motor rotor 102 is mounted to tie rod 106 to drive rotation of tie rod 106 in air compressor 100.

Compressor section 104 includes compressor housing 120, compressor inlet 122, compressor outlet 124, and compressor rotor 126. Compressor housing 120 includes a duct that forms compressor inlet 122 and a duct that forms compressor outlet 124. Compressor inlet 122 draws air into compressor section 104. Positioned in compressor housing 120 is compressor rotor 126. Compressor rotor 126 is driven with motor 102 and is mounted on tie rod 106 to rotate with tie rod 106 about axis B. Air that is drawn into compressor section 104 through compressor inlet 122 is compressed with compressor rotor 126 before exiting compressor section 104 through compressor outlet 124.

Air compressor 100 further includes first bearing 130, first rotating shaft 132, second bearing 134, and second rotating shaft 136. First bearing 130 is positioned in motor 102 and is supported by motor housing 110. First rotating shaft 132 is mounted on and rotates with tie rod 106. A radially outer surface of first rotating shaft 132 abuts a radially inner surface of first bearing 130. Second bearing 134 is positioned in motor 102 and is supported by motor housing 110. Second rotating shaft 136 extends between and rotates with motor rotor 112 and compressor rotor 126. A radially outer surface of second rotating shaft 136 abuts a radially inner surface of second bearing 134.

FIGS. 3-11 describe various embodiments of a foil bearing and of a bearing and damping structure of a foil bearing. Any of the embodiments of the foil bearing and any of the embodiments of the bearing and damping structure of the foil bearing can be used for the bearings in the air cycle machine 10 shown in FIG. 1 and/or the bearings in the air compressor 100 shown in FIG. 2. The air cycle machine 10 shown in FIG. 1 and the air compressor 100 shown in FIG. 2 are exemplary rotary machines and the foil bearing and the bearing and damping structure of the foil bearing can be used in other rotary machines as well.

Figure 3:
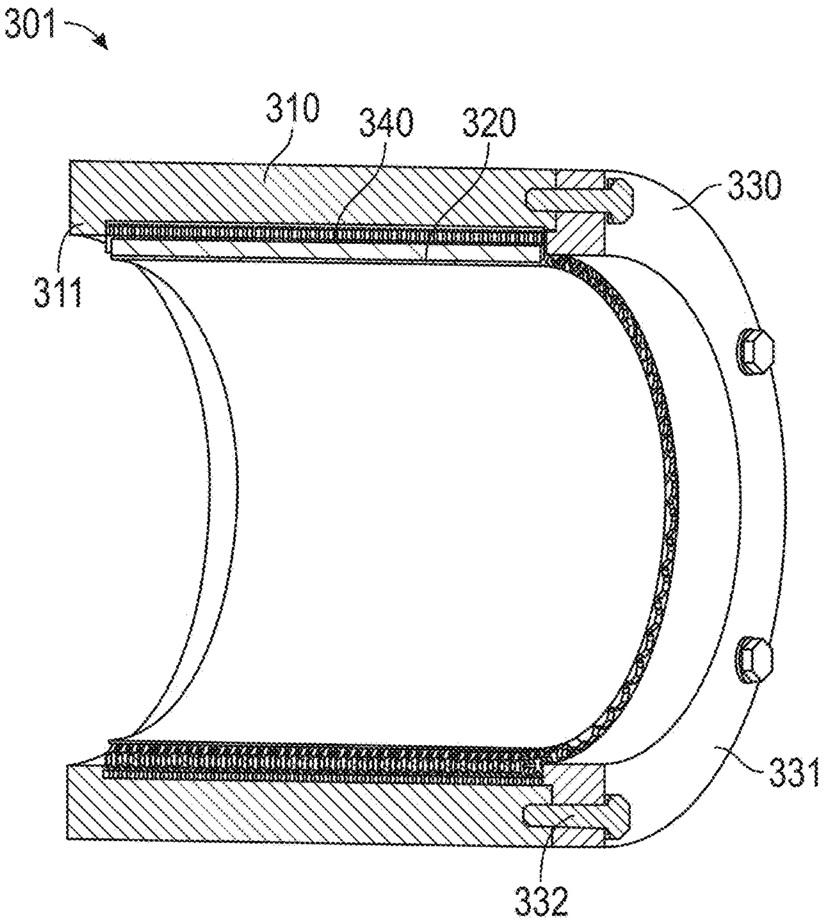
FIG. 3 is a cutaway perspective view of a foil bearing for use in the air cycle machine of FIG. 1 and/or the air compressor of FIG. 2 in accordance with embodiments.
Figure 4:
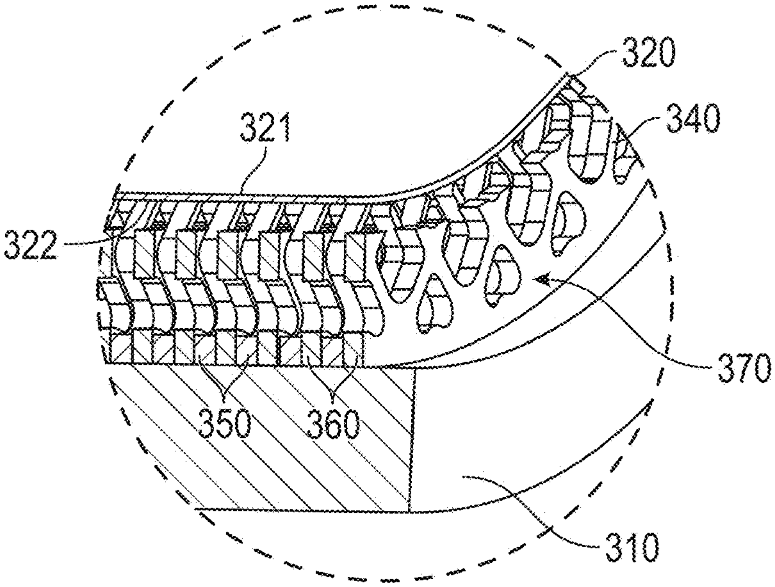
FIG. 4 in an enlarged perspective view of a portion of the foil bearing of FIG. 3 in accordance with embodiments.
Figure 5A:
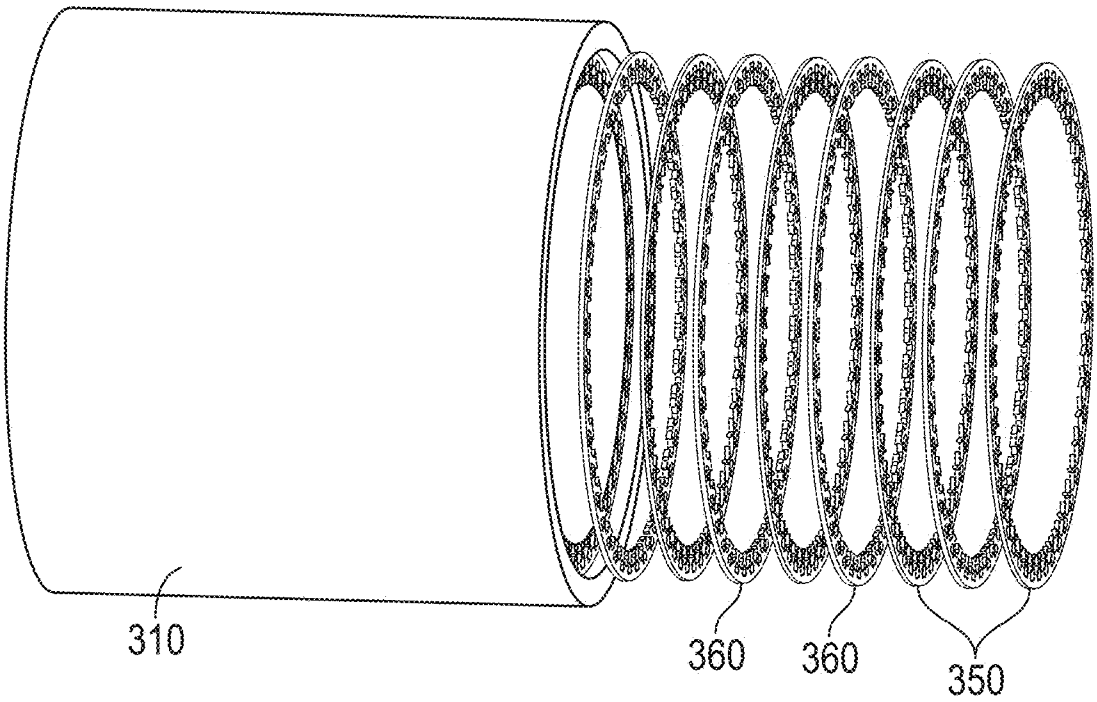
FIGS. 5A and 5B are exploded perspective views of spring and damper plates of the foil bearing of FIG. 3 in accordance with embodiments.
Figure 5B:
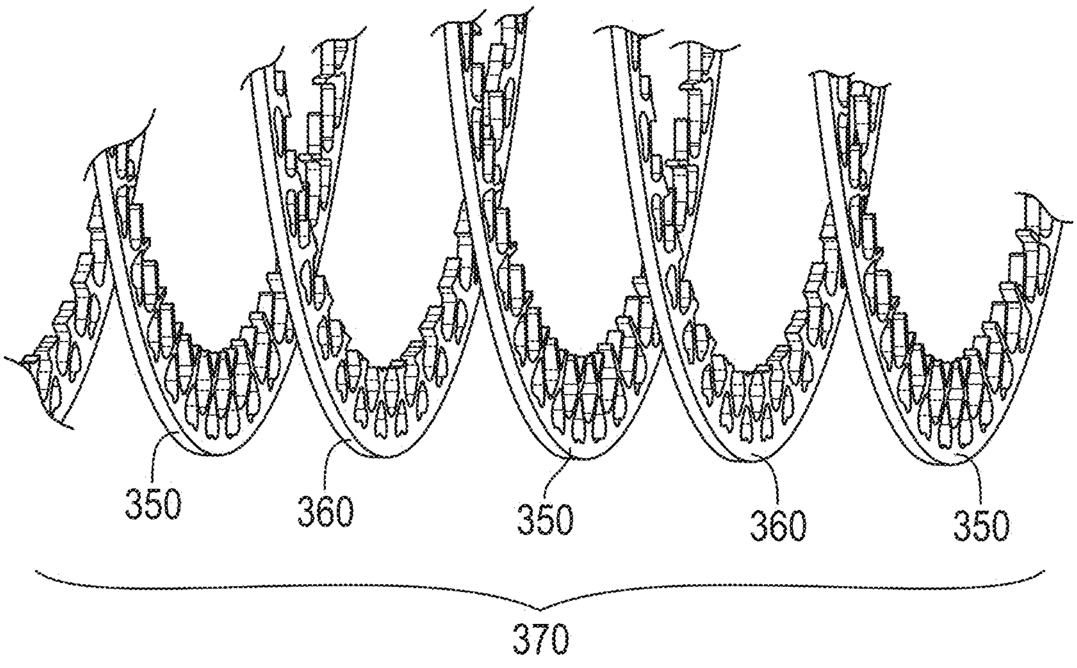
Figure 6:
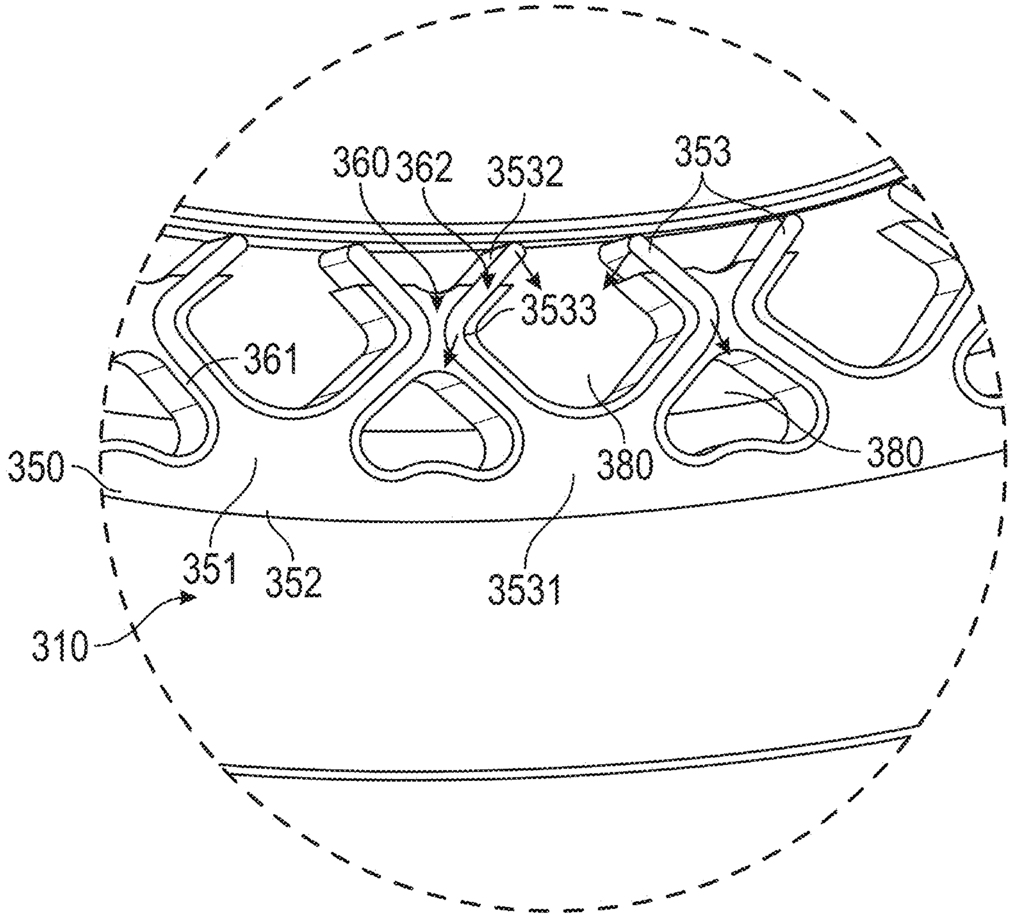
FIG. 6 is an enlarged view of spring and damper plate components in accordance with embodiments.

With reference to FIG. 3-7B, a foil bearing 301 is provided and includes a bearing sleeve 310 with an interior flange 311, a foil body 320, a clamp 330 and a bearing and damping structure 340. The foil body 320 can include at least a top foil 321, which is formed to define a bore in which a rotating shaft is disposable. In some cases, the foil body 320 can also include one or more intermediate foils 322 radially interposed between the bearing and damper structure 340 and the top foil 321. The bearing and damping structure 340 is radially interposed between an interior surface of the bearing sleeve 310 and an exterior surface of the foil body 320 and includes spring plates 350 and damper plates 360. As shown in FIG. 4 and in FIGS. 5A and 5B, the spring plates 350 and the damper plates 360 are laminated and interleaved with one another to form an axial spring-damper plate arrangement 370. As shown in FIG. 6, each spring plate 350 includes an annular body 351, an exterior surface 352 of the annular body 351 that can be disposed in contact with the interior surface of the bearing sleeve 310 and an annular array of fingers 353. Each of the fingers 353 extends inwardly from the annular body 351 at angles defined with respect to the radial dimension to support the foil body 320 against radially-directed compressive forces applied to the foil body 320 (i.e., by the rotating shaft).

In accordance with embodiments, each finger 353 of each spring plate 350 can include a base 3531 at the corresponding annular body 351, a distal tip 3532 to contact the foil body 320 and one or more bends 3533 that are radially interposed between the base 3531 and the distal tip 3532. In accordance with further embodiments, each finger 353 of each spring plate 350 can include one or two or more directionally opposed bends 3533 that are radially interposed between the base 3531 and the distal tip 3532. Each damper plate 360 can have a generally similar configuration as the spring plates 350. That is, each damper plate 360 can include an annular damper body 361 and an annular array of damper fingers 362 that each extend from the annular damper body 361 and, in addition, each damper finger 362 of each damper plate 360 can include a base at the corresponding annular damper body 361, a distal tip and one or more bends radially interposed between the base and the distal tip.

As used herein, the term "interleaved" refers to a structural arrangement in which the spring plates 350 and the damper plates 360 reside side-by-side and touch on their parallel outermost axial surfaces with the fingers 353 and the damper fingers 362 not being locked or otherwise tangled together.

With the above-described configurations and/or with other configurations, the spring plates 350 and the damper plates 360 can be cooperatively formed to define cooling air holes 380.

The clamp 330 can be configured in various manners. For example, as shown in FIG. 3, the clamp 330 may include an assembly clamping plate 331 and fasteners 332 that are spaced circumferentially around the foil bearing 301 and that fasten the assembly clamping plate 331 to the bearing sleeve 310. When the foil bearing 301 is assembled and the assembly clamping plate 331 is fastened to the bearing sleeve 310 by the fasteners 332, the clamp 330 exerts, on the bearing and damping structure 340, an axially-directed clamping force (see FIG. 9) such that the bearing and damping structure 340 impinges against the interior flange 311. The axially-directed clamping force may be substantially circumferentially uniform (see FIG. 9).

The axially directed clamping force induces damper-spring plate friction between each damper plate 360 and the neighboring spring plates 350. The damper-spring plate friction in turn causes one or more of the fingers 353 to resist deformation due to the radially-directed compressive forces for damping. The axially-directed clamping force of the clamp 330 can additionally or alternative be generated by the clamp 330 including a series of coil springs spaced circumferentially around the foil bearing 301 and/or by a bellville-type spring.

In any case, an increase in the axially-directed clamping force via tightened fasteners 332 and/or by stiffer springs will increase a magnitude of the damper-spring plate friction between each damper plate 360 and the neighboring spring plates 350 and lead to a correspondingly increased damping value for the foil bearing 301. Conversely, a decrease in the axially-directed clamping force via loosened fasteners 332 and/or by less stiff springs will decrease the magnitude of the damper-spring plate friction between each damper plate 360 and the neighboring spring plates 350 and lead to a correspondingly decreased damping value for the foil bearing 301.

With the fingers 353 of the spring plates 350 disposed to support the foil body 320 against the radially-directed compressive forces applied to the foil body 320, the spring plates 350 effectively provide a backup stiffness to the foil body 320. As shown in FIG. 5, as the radially-directed compressive forces are applied to the foil body 320, one or more of the fingers 353 are deflected radially outwardly. This deflection is manifested as relative motion between the one or more of the fingers 353 that are deflected and the neighboring damper plates 360. The relative motion between the one or more of the fingers 353 that are deflected and the neighboring damper plates 360 utilize a coefficient of friction and the axially-directed clamping force to absorb energy via coulomb friction to thereby generate a damping force. The damping force can act generally in opposition to the radially-directed compressive forces applied to the foil body 320.

Figure 7A:
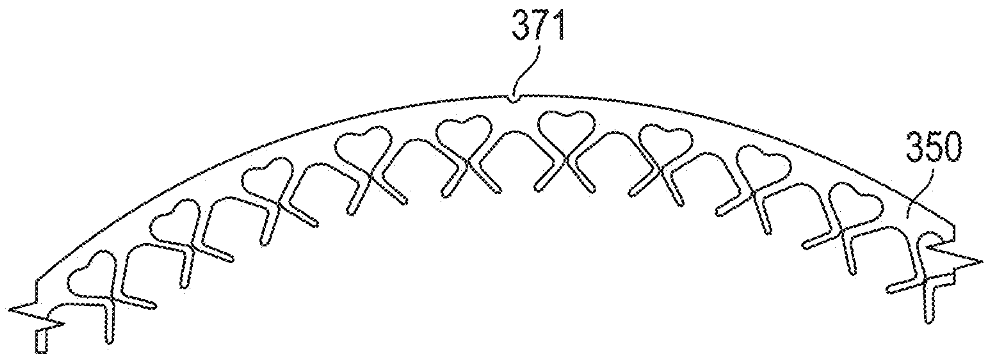
FIGS. 7A and 7B, are axial views of anti-rotation features of the foil bearing of FIG. 3 in accordance with embodiments.
Figure 7B:
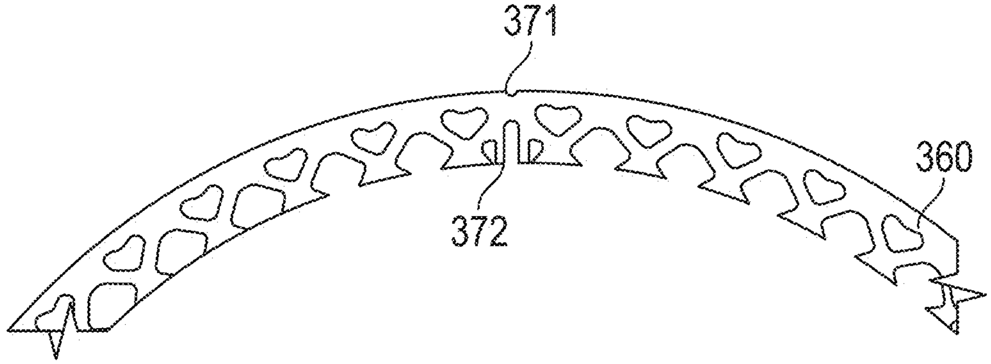

As shown in FIGS. 7A and 7B, the foil bearing 301 can also include at least one of an outboard anti-rotation feature 371 and an inboard anti-rotation feature 372. The outboard anti-rotation feature 371 is disposed and configured to prevent relative rotation between the bearing sleeve 310 and the bearing and damping structure 340. In accordance with embodiments, the outboard anti-rotation feature 371 can be provided as a notch formed in one or more of the spring plates 350 and/or in one or more of the damper plates 360 into which a protrusion of the bearing sleeve 310 extends. The inboard anti-rotation feature 372 is disposed and configured to prevent relative rotation between the bearing and damping structure 340 and the foil body 320. In accordance with embodiments, the inboard anti-rotation feature 372 can be provided as a notch formed in one or more of the spring plates 350 and/or in one or more of the damper plates 360 into which a protrusion of the foil body 320 extends.

Figure 8:
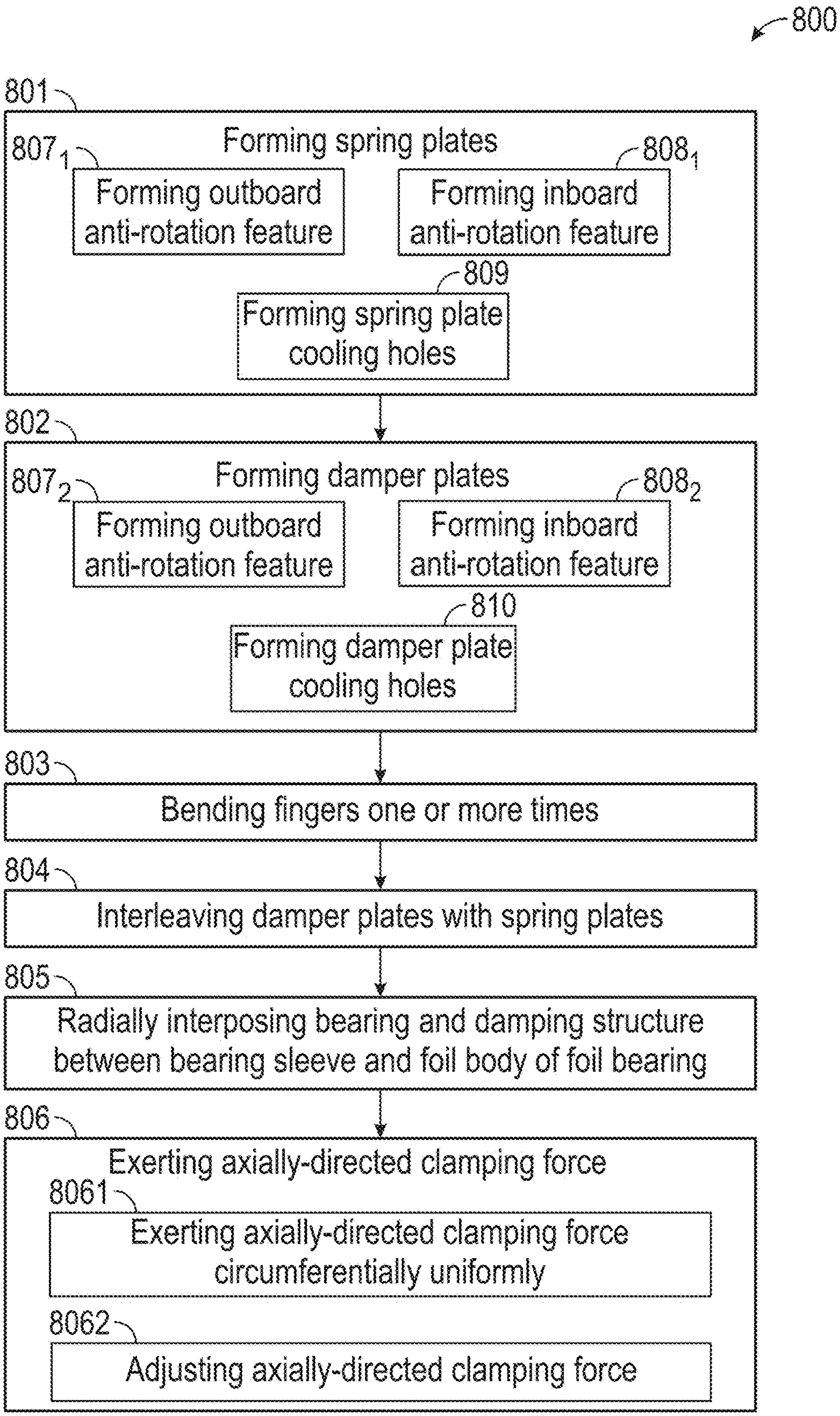
FIG. 8 is a flow diagram illustrating a method of assembling a foil bearing in accordance with embodiments.

With reference to FIG. 8, a method 800 of assembling a foil bearing capable of damping, such as the above-described foil bearing 301, is provided. The method includes forming spring plates as described above (block 801) and forming damper plates as described above (block 802) by at least one or more of laser cutting, water jet cutting, photochemical etching, 3D printing, punching, other similar processes and/or combinations thereof. The method 800 can also include bending at least each finger of each spring plate one or more times (block 803). The method 800 further includes interleaving the damper plates with the spring plates by lamination processes or other similar processes to assemble a bearing and damping structure (block 804), radially interposing the bearing and damping structure between a bearing sleeve and a foil body of the foil bearing (block 805) and exerting, on the bearing and damping structure, an axially-directed clamping force (block 806) such that the axially-directed clamping force induces damper-spring plate friction causing one or more of the fingers of the spring plates to resist deformation due to the radially-directed compressive forces for generating and effectuating a damping capability. The exerting of the axially-directed clamping force of block 806 can include at least one or more of executing the exerting of the axially-directed clamping force circumferentially uniformly (block 8061) and adjusting the axially-directed clamping force to adjust a degree of the damping (block 8062).

At least one of the forming of the spring plates of block 801 and the forming of the damper plates of block 802 can include at least one of forming an outboard anti-rotation feature to prevent relative rotation between the bearing sleeve and the bearing and damping structure (block $\mathbf{807}_1$, $\mathbf{807}_2$) and forming an inboard anti-rotation feature to prevent relative rotation between the bearing and damping structure and the foil body (block $\mathbf{808}_1$, $\mathbf{808}_2$). In addition, the forming of the spring plates of block 801 can include forming the spring plates to define spring plate cooling air holes (block 809) and the forming of the damper plates of block 802 can include forming the damper plates to define damper plate cooling air holes which are cooperative with the spring plate cooling air holes (block 810).

Figure 9:
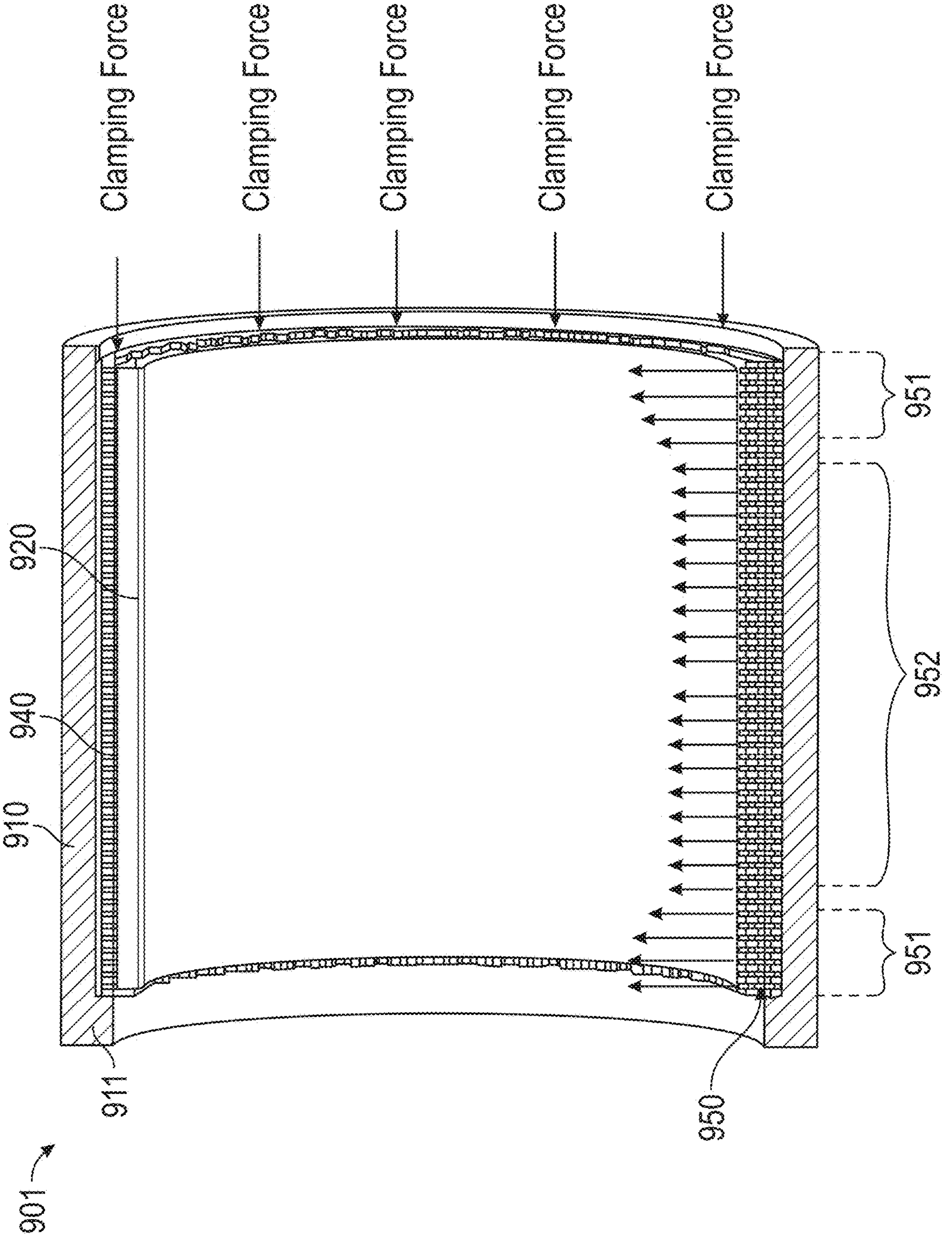
FIG. 9 is a cutaway perspective view of a foil bearing with zones of varying stiffness in accordance with embodiments.

With reference to FIG. 9, a foil bearing 901 is provided and is generally similar to the above-described foil bearing 301. As such, components of the foil bearing 901 that are similar to or the same as corresponding components of the foil bearing 301 will not be re-described in detail.

The foil bearing 901 includes a bearing sleeve 910 with an interior flange 911, a foil body 920, a clamp to exert a circumferentially uniform axially-directed clamping force and a bearing and damping structure 940. The foil body 920 can include at least a top foil and, in some cases, one or more intermediate foils. The bearing and damping structure 940 is radially interposed between an interior surface of the bearing sleeve 310 and an exterior surface of the foil body 920 and includes interleaved spring plates and damper plates that form an axial spring and damper plate arrangement 950. Each spring plate includes an annular body, an exterior surface that can be disposed in contact with the interior surface of the bearing sleeve 910 and an annular array of fingers. Each of the fingers extends inwardly from the annular body at angles defined with respect to the radial dimension to support the foil body 920 against radially-directed compressive forces applied to the foil body 920 (i.e., by the rotating shaft).

In accordance with embodiments, each of the spring plates has a characteristic thickness and one or more of the spring plates can have a unique characteristic stiffness as compared to other ones of the spring plates. This can be achieved by the one or more of the spring plates, which have the unique characteristic stiffness, having a unique geometry as compared to the other ones of the spring plates, having thicker or thinner fingers as compared to other ones of the spring plates and/or having unique material properties as compared to other ones of the spring plates.

In any case, where damper-spring plate friction is induced between each damper plate and neighboring spring plates due to the axially-directed clamping force being exerted on the bearing and damping structure 940, one or more of the fingers are caused to resist deformation due to the radially-directed compressive forces for damping associated with spring plate characteristic stiffnesses. Thus, the one or more of the spring plates that have the unique characteristic stiffness can be arranged to form zones of the axial spring and damper plate arrangement of varying stiffness. For example, as shown in FIG. 9, spring plates at opposite ends of the axial spring and damper plate arrangement 950 can have higher characteristic stiffness than spring plates in a center of the axial spring and damper plate arrangement 950.

The stiffer spring plates on both ends of the bearing can lead to a stiffer bearing structure 951 at the ends of the bearing, leading to increased radial load on the top foil at the ends of the bearing and in turn to improved sealing near the ends of the bearing. Likewise, the softer spring plates near the center of the bearing can produce a central zone 952 with a smaller radial force on the top foil, leading to less clamping of the structure and in turn leading to a thicker film thickness in the center of the bearing with decreased heating toward the center of the bearing.

In some cases, the stiffer and softer spring plates of FIG. 9 can also lead to relatively high damping zones at the opposite ends of the axial spring and damper plate arrangement, a relatively low damping zone in the center of the axial spring and damper plate arrangement 950 along with transitional damping zones between the relatively high damping zones and the relatively low damping zone. It is to be understood, however, that the differences in damping would be relatively small from one zone to the next.

Figure 10:
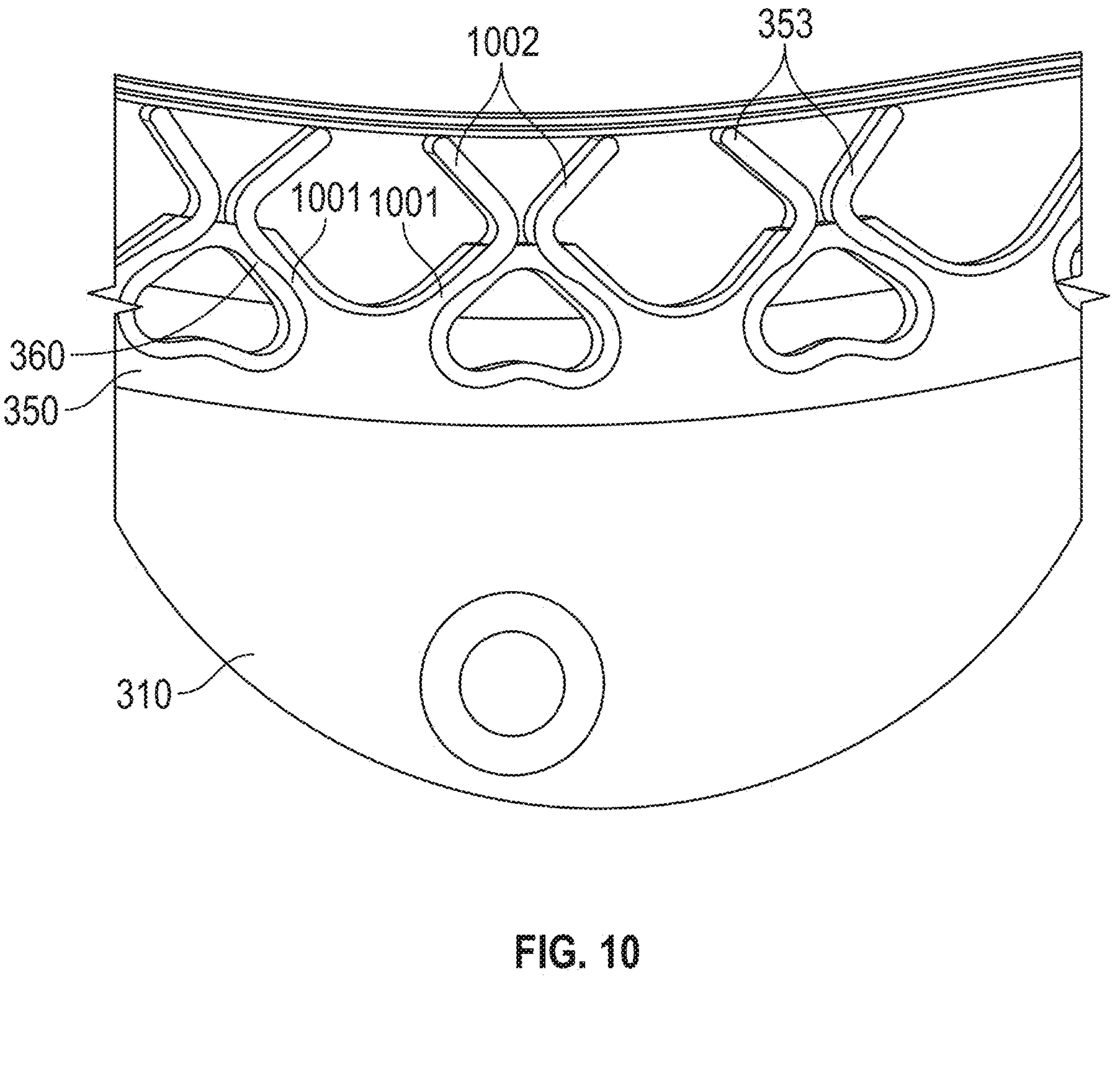
FIG. 10 is an enlarged view of spring and damper plate components with outboard-preload and inboard-operating sections in accordance with embodiments.

With continued reference to FIGS. 3-9 and with additional reference to FIG. 10 (the foil bearing 301 will be referenced herein for purposes of clarity and brevity, though it is to be understood that the following description applies similarly to the foil bearing 901), the fingers 353 of each spring plate 350 can include an outboard-preload section 1001 and an inboard-operating section 1002 that are angled with respect to a radial dimension and with respect to one another. In accordance with embodiments, the outboard-preload section 1001 of each finger 353 of each spring plate 350 deforms more easily than the corresponding inboard-operating section 1002 by, for example, the outboard-preload section 1001 being thinner than the corresponding inboard-operating section 1002 as shown in FIG. 10 and, in some cases, having a relatively long moment arm.

During assembly, the clamp 330 is initially loose to relieve the axially-direction clamping force on the spring plates 350 and the damper plates 360. With the axially-directed clamping force relieved, the outboard-preload section 1001 of each finger 353 of each spring plate 350 is allowed to move with a relatively small force applied as made possible by the outboard-preload section 1001 being configured to deform relatively easily. The outboard-preload section 1001 of each finger 353 of each spring plate 350 allow the foil body 320 to move and conform to a position and size of the rotating shaft without changing an applied pre-load. Subsequently, with the foil body 320 pre-loaded, the axially-directed clamping force is exerted on the bearing and damping structure 340 (see FIG. 3) and the fingers 353 are immobilized. At this point, a radial spring rate of the foil bearing 301 is controlled by the inboard-operating section 1002 of each finger 353 of each spring plate 350.

Figure 11:
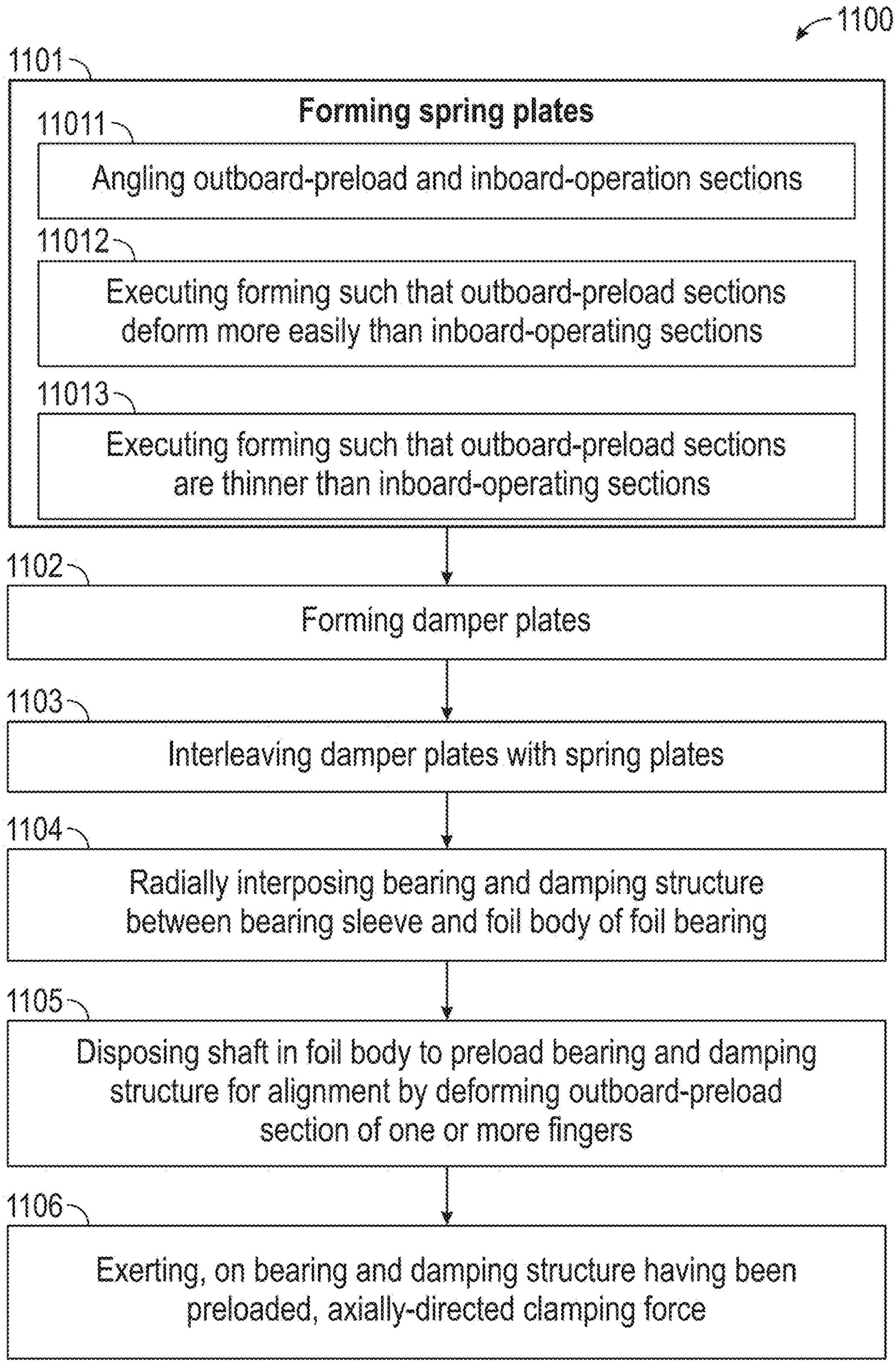
FIG. 11 is a flow diagram illustrating a method of assembling a foil bearing with alignment and preloading in accordance with embodiments.

With reference to FIG. 11, a method 1100 of assembling a foil bearing capable of damping, such as the above-described foil bearing 301 (and the above-described foil bearing 901), is provided. As shown in FIG. 11, the method includes forming spring plates as described above to include outboard-preload and inboard-operating sections (block 1101), forming damper plates as described above (block 1102), interleaving the damper plates with the spring plates to assemble a bearing and damping structure (block 1103) and radially interposing the bearing and damping structure between a bearing sleeve and the foil body (block 1104). The method 1100 further includes disposing a shaft in the foil body to preload the bearing and damping structure for alignment by deforming the outboard-preload section of one or more of the fingers (block 1105) and exerting, on the bearing and damping structure having been preloaded, an axially-directed clamping force (block 1106) that induces damper-spring plate friction causing one or more of the fingers to resist deformation due to the radially-directed compressive forces for damping.

As noted above, the forming of the spring plates of block 1101 can include angling the outboard-preload section and the inboard-operating section of each finger of each spring plate with respect to a radial dimension and with respect to one another (block 11011), can be executed such that the outboard-preload section of each finger of each spring plate deforms more easily than the corresponding inboard-operating section (block 11012) and/or can be executed such that the outboard-preload section of each finger of each spring plate is thinner than the corresponding inboard-operating section (block 11013).

Technical effects and benefits of the present disclosure are the provision of a foil bearing with a backup structure that provides for damping. This improves foil bearing performance while reducing developmental and operational costs. In addition, tolerances of individual parts will be allowed to be significantly looser than in conventional bearings, since the bearing structure can accommodate both bearing misalignment and fairly wide geometric tolerances relative to conventional bearings. As such, foil bearings will no longer need to be matched sets and bearing load capacity will increase since pressure loading of the bearing will now be more uniform.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A bearing and damping structure of a foil bearing, the bearing and damping structure comprising:

interleaved spring plates and damper plates, each spring plate comprising an annular array of fingers to support a foil body of the foil bearing against radially-directed compressive forces, and friction induced between each damper plate and neighboring spring plates causing the fingers of the neighboring spring plates to resist deformation due to the radially-directed compressive forces for damping, wherein each spring plate comprises an annular body from which each finger extends, each finger of each spring plate comprises a radially inward distal tip and each damper plate comprises:

an annular damper body which, in an axial direction of the foil bearing, exceedingly overlaps with the annular body of the neighboring spring plates; and an annular array of damper fingers that each extend from the annular damper body and which, in the axial direction of the foil bearing, exceedingly overlap with respective corresponding portions of the fingers of the neighboring spring plates except for the radially inward distal tips.

2. The bearing and damping structure according to claim 1, wherein the spring plates and the damper plates are cooperatively formed to define cooling air holes.

3. The bearing and damping structure according to claim 1, wherein: each spring plate comprises an annular body from which each finger extends and each finger of each spring plate comprises a base at the corresponding annular body and one or more bends radially interposed between the base and the radially inward distal tip.

4. A bearing and damping structure of a foil bearing, the bearing and damping structure comprising:

interleaved spring plates and damper plates, each spring plate comprising an annular array of fingers to support a foil body of the foil bearing against radially-directed compressive forces, and friction induced between each damper plate and neighboring spring plates causing the fingers of the neighboring spring plates to resist deformation due to the radially-directed compressive forces for damping, wherein each spring plate comprises an annular body from which each finger extends and each finger of each spring plate comprises a base at the corresponding annular body, a distal tip and one or more bends radially interposed between the base and the distal tip, and each finger of each spring plate comprises two or more directionally opposed bends radially interposed between the base and the distal tip.

5. A foil bearing, comprising:

a bearing sleeve;

a foil body;

a clamp; and a bearing and damping structure radially interposed between the bearing sleeve and the foil body and comprising interleaved spring plates and damper plates, each spring plate comprising an annular array of fingers to support the foil body against radially-directed compressive forces, and the clamp exerting, on the bearing and damping structure, an axially-directed clamping force that induces damper-spring plate friction causing one or more of the fingers to resist deformation due to the radially-directed compressive forces for damping.

6. The foil bearing according to claim 5, further comprising at least one of:

an outboard anti-rotation feature to prevent relative rotation between the bearing sleeve and the bearing and damping structure; and an inboard anti-rotation feature to prevent relative rotation between the bearing and damping structure and the foil body.

7. The foil bearing according to claim 5, wherein the bearing sleeve comprises an interior flange against which the bearing and damping structure impinges.

8. The foil bearing according to claim 5, wherein the foil body comprises at least a top foil.

9. The foil bearing according to claim 5, wherein the spring plates and the damper plates are cooperatively formed to define cooling air holes.

10. The foil bearing according to claim 5, wherein:

each spring plate comprises an annular body from which each finger extends, and each finger of each spring plate comprises a base at the corresponding annular body, a distal tip to contact the foil body and one or more bends radially interposed between the base and the distal tip.

11. The foil bearing according to claim 10, wherein each finger of each spring plate comprises two or more directionally opposed bends radially interposed between the base and the distal tip.

12. The foil bearing according to claim 5, wherein each damper plate comprises an annular damper body and an annular array of damper fingers that each extend from the annular damper body.

13. The foil bearing according to claim 5, wherein the axially-directed clamping force is circumferentially uniform.

14. A method of assembling a foil bearing capable of damping, the method comprising:

forming spring plates to each comprise an annular array of fingers to support a foil body against radially-directed compressive forces;

forming damper plates;

interleaving the damper plates with the spring plates to assemble a bearing and damping structure;

radially interposing the bearing and damping structure between a bearing sleeve and the foil body; and exerting, on the bearing and damping structure, an axially-directed clamping force that induces damper-spring plate friction causing one or more of the fingers to resist deformation due to the radially-directed compressive forces for damping.

15. The method according to claim 14, wherein at least one of the forming of the spring plates and the forming of the damper plates comprises at least one of:

forming an outboard anti-rotation feature to prevent relative rotation between the bearing sleeve and the bearing and damping structure; and forming an inboard anti-rotation feature to prevent relative rotation between the bearing and damping structure and the foil body.

16. The method according to claim 14, wherein:

the forming of the spring plates comprises forming the spring plates to define spring plate cooling air holes, and the forming of the damper plates comprises forming the damper plates to define damper plate cooling air holes which are cooperative with the spring plate cooling air holes.

17. The method according to claim 14, wherein the forming of the spring plates comprises bending each finger of each spring plate one or more times.

18. The method according to claim 14, wherein the exerting of the axially-directed clamping force is executed circumferentially uniformly.

19. The method according to claim 14, further comprising adjusting the axially-directed clamping force to adjust a degree of the damping.

* * * * *